Nov. 23, 1926. 1,607,932
J. B. WHITMORE ET AL
CUT CANE AND TUBING SORTER
Filed May 5, 1921 3 Sheets-Sheet 1
Fig.1
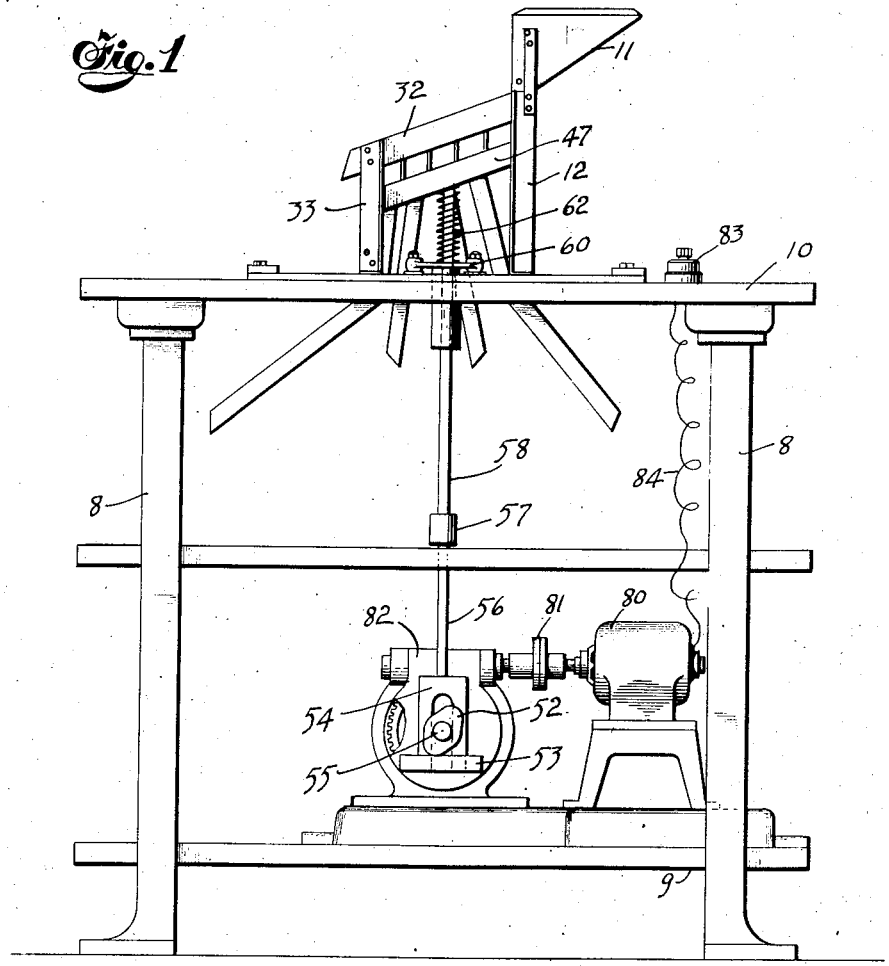
Inventors
JAMES B. WHITMORE
JOHN E. FERGUSON
By their Attorney

Nov. 23, 1926.  1,607,932

J. B. WHITMORE ET AL

CUT CANE AND TUBING SORTER

Filed May 5, 1921  3 Sheets-Sheet 3

Inventors
JAMES B. WHITMORE
JOHN E. FERGUSON
By their Attorney

Patented Nov. 23, 1926.

1,607,932

UNITED STATES PATENT OFFICE.

JAMES BRYANT WHITMORE AND JOHN EBLING FERGUSON, OF BLOOMFIELD, NEW JERSEY, ASSIGNORS TO WESTINGHOUSE LAMP COMPANY, A CORPORATION OF PENNSYLVANIA.

CUT CANE AND TUBING SORTER.

Application filed May 5, 1921. Serial No. 466,926.

This invention relates to machines for gaging articles and more particularly it relates to automatic mechanism for gaging, at one or more points, the diameters of cut cane or tubing and like articles.

An object of the invention is to provide a mechanism for passing a stream of articles over a series of gages and for separating from the stream all articles of corresponding sizes.

Another object of the invention is to provide automatic mechanism for gaging the diameters of cane or tubing used in the manufacture of incandescent lamps, and segregating all the gaged cane or tubing of like sizes into separate groups for use in automatic machines adjusted to receive cane or tubing of predetermined size, or for other purposes.

Other objects will be apparent from the following detailed description.

Cane or tubing of glass are received in a factory usually in lengths approximating three feet or more, and it is found that their cross-sectional dimensions are not uniform throughout their lengths. The cane or tubing are gaged and sorted into groups, the cane or tubing of each group having approximately the same diameter. Thereafter they are cut into short lengths of approximately three inches. Heretofore, it has been customary to gage these short length canes or tubes by hand, and, in order to avoid such a tedious and laborious operation and to reduce the cost of the operation, a mechanism, an illustration of which is embodied in the accompanying drawings, may be provided which will automatically and accurately gage short length cane or tubing with great rapidity.

The accompanying drawings illustrate an embodiment selected as incorporating the invention, wherein—

Fig. 1 is a side elevation of the entire machine;

Hereafter, whenever the words cane or canes are employed it is to be understood that tubes or tubing or articles of that general nature and, if desired, of other material may be used, as it is obvious that the apparatus will function as well with the one as with the other.

The present machine may consist essentially of a mechanism for successively feeding canes of predetermined lengths to a series of multiple-point gages of different sizes, preferably arranged in descending or inclined formation. The canes are received successively by the first gage of the series and, if any cane fails to pass through that gage, it is raised vertically until so positioned with respect to the contour of the machine that the potential energy inherent in the cane moves it downwardly along the face of the machine toward the next gage of the series. The cane is arrested in its movement toward the second gage, first by a pusher which removes the non-gaged cane from the gage and then by means of a raised ledge when the pusher is withdrawn. This operation is repeated each time any cane fails to pass through any one of the gages. Canes which pass through the gages are guided by suitable chutes into collection containers.

Figure 2:
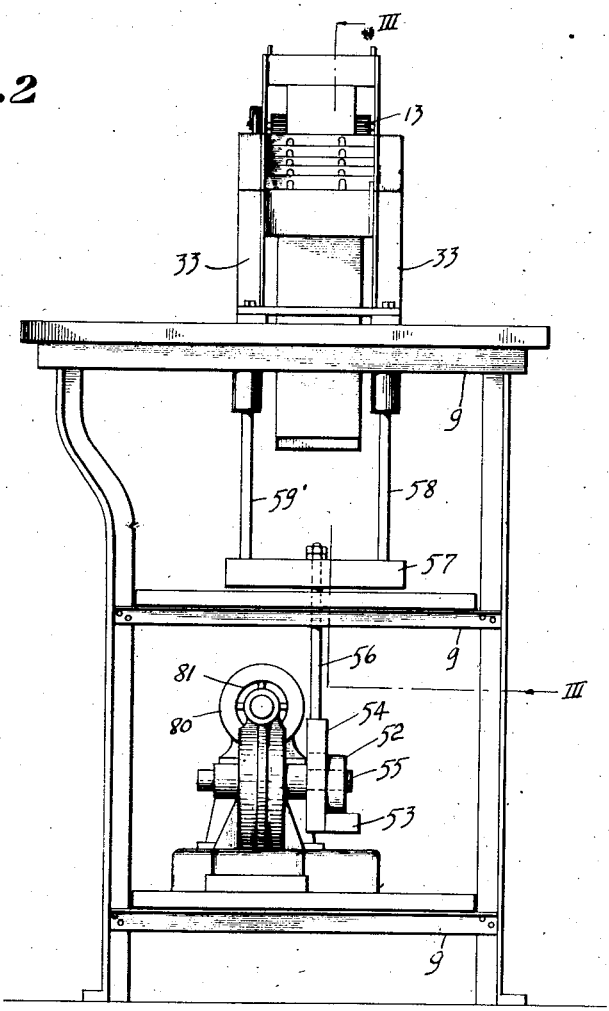
Fig. 2 is a rear end elevation thereof.

Referring now to Figs. 1 and 2 of the drawings, the standards 8 connected by the cross beams 9 form a frame which supports the table 10, upon which the feeding and gaging mechanisms are mounted.

Figure 3:
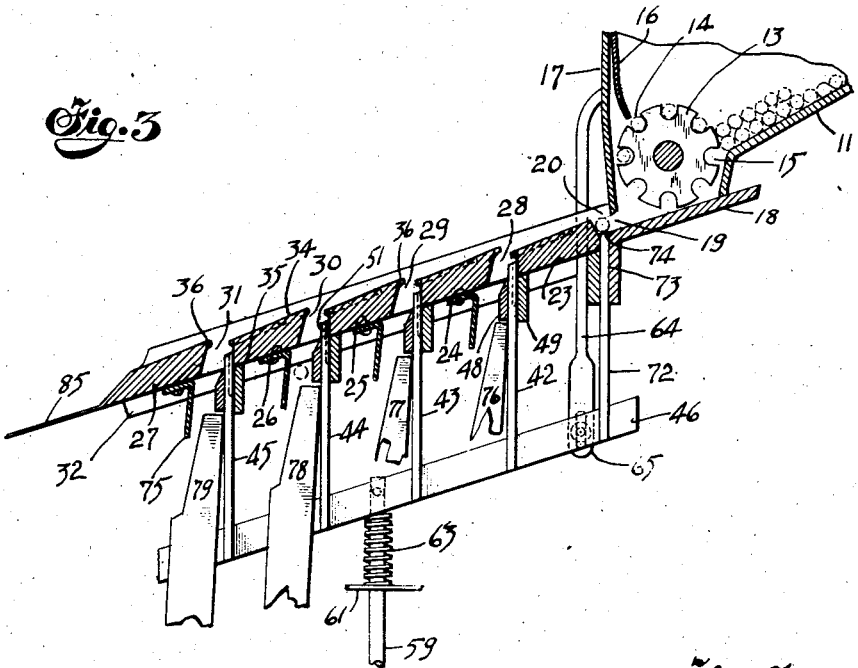
Fig. 3 is a partial cross-section on the line III—III of Fig. 2 in the direction of the arrow, illustrating the arrangement of the gages and the feeding device.

In performing the gaging operation, the cane may be fed to the gages by suitable automatic mechanism which arranges them in succession and substantial parallelism. A selected form of such mechanism (Figs. 1 and 3) preferably comprises an elevated hopper 11 secured to supports 12 and fastened to the table 10 in any desired manner. The canes are successively fed and arranged in parallelism, preferably by a conveyor cooperating with the hopper. A selected form of conveyor is illustrated as a feed roller 13 rotatably secured in an opening 14 of the hopper 11. The face of the feed roller is usually provided with a plurality of longitudinal recesses 15 of sufficient size to accommodate the largest of the canes to be gaged. To prevent more than one cane at a time from being carried out of the hopper through the opening 14, a stripper plate 16 is secured to the wall 17 of the hopper in such manner as to have its lower edge positioned adjacent to the face of the feed roller. The wall 17 has its lower edge arranged adjacent to the face of the feed roller and spaced from the lower edge of an inclined plate 18 that constitutes a bottom for the hopper 11. An outlet opening 19 is thus formed through which the canes may pass to a pocket 20 (Fig. 3). The hopper wall 17 lies close to the face of the roller 13 for preventing the canes in the recesses 15 from falling from the roller until they reach a position near the outlet 19, through which they pass to the receiving pocket 20.

The gaging and sorting of the canes may be performed in various ways but it is preferable that such operation be carried out in an automatic machine which moves the cane in a stream to gages of different sizes until a gage is reached corresponding in size to the cane, whereupon it passes, or is removed, from the stream of canes through the gage into a chute which conducts it to a receiving receptacle. A machine which will be found to fulfil all these requirements may comprise a series or plurality of downwardly inclined or descending plates 23, 24, 25, 26 and 27 having their edges spaced apart to form gaging apertures 28, 29, 30 and 31. The above described plates constitute, as a whole, an inclined or guide member in the form of a chute down which the articles are permitted to roll or slide.

Support for these plates is afforded by the longitudinal beams 32 (Fig. 1) secured, at one of their ends, to the upper ends of the supports 12 and, at their opposite ends, to the upper ends of supports 33; the latter being of shorter length so that the beams 32 are downwardly inclined, with the higher end adjacent the hopper 11. The plates 23 etc. may have thick upper ends 34 and thin lower ends 35, by which arrangement, when the lower faces of the plates 23 etc. lie approximately in the same plane, a raised ledge or check 36 is provided adjacent to or as an integral part of, each gaging aperture 28 etc. Thus, it will be apparent that articles moving down the upper faces of the plates will be arrested in turn by the ledges 36 opposite each gaging aperture, after release by pusher plates, later to be described.

Figure 4:
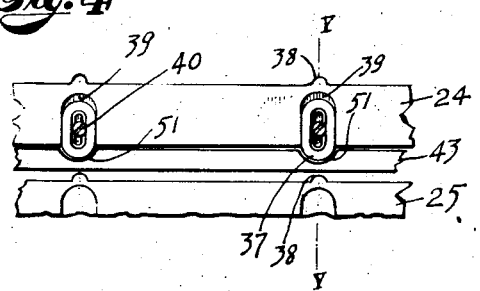
Fig. 4 is a detail plan view of a gage showing more particularly, a plurality of gage jaws or points.
Figure 5:
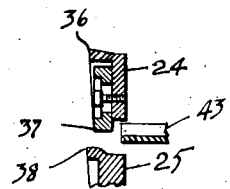
Fig. 5 is a cross section on line V—V of Fig. 4.

The gages proper preferably comprises a plurality of jaws or points, hereinafter termed jaws, arranged in pairs or sets 37 and 38 (see Fig. 4), the former being adjustably mounted in slots 39 and locked in any adjusted position by means of clamping screw 40. As many of these sets of jaws as are found desirable, may be secured in any of the gaging apertures, the number usually depending on the accuracy required. It may be found desirable to adjust the gage jaws at such distances apart that those in the upper aperture will be of the smallest size while those in the lowest aperture will be the largest. Or it may be preferable to have a series of sets of gage jaws of one size and another series or several series of a different size, whereby canes of varying diameters may be gaged. Another arrangement is to have the canes fed to but one series of sets of gage jaws so only one end or portion may be gaged. Suitable provision may be made in the hopper for an adjustment of this kind. However, these arrangements are a matter of preference, and any other grouping may be resorted to without departing from the scope of this invention.

In transferring cane from one gage to another, it is found desirable to provide a suitable automatic means. A convenient means for performing such operation comprises a mechanism operating between the gage jaws. A form of such mechanism preferably consists of a series of pusher or ejector plates 42, 43, 44 and 45 formed integral with, or connected to, two guides 46 and 47 (Figs. 1 and 3) which are guided between the supports 12 and 33. The upper end of each pusher plate may be guided into proper alignment with the gaging aperture in which it operates by means of vertical plates 48 and 49, positioned on each side of the pusher plate and secured, in any desired manner, to the beams 32. The sides of the pusher plates are grooved at 51 to permit them to pass the adjustable jaws 37, while the opposite faces of the plates are perfectly plain. The upper edges of the pusher plates are preferably beveled at approximately the same angle as the upper face of the plates 23 etc., as will be apparent from a further detailed description.

Occasions may arise, during the operation of the machine, when the operating mechanisms jam while the operator is attending other machines. This jamming may be due to obstruction of the gaging apertures or other reasons. To avoid damage to the machine and to prevent the further feeding of the cane when an accident occurs, it is found desirable to provide a special construction in the operating mechanism. One form of apparatus which prevents jamming preferably comprises a mechanism which, in its positive operation, moves the pusher plates downward, and a yeildable means for nomally maintaining the plates in their uppermost position between openings 29, 30 etc. A suitable positive operating means comprises a cam 52 co-operating with a footpiece 53 secured to a saddle 54 astride the shaft 55, to which the cam 52 is secured. The saddle is connected by a rod 56 to the cross beam 57 having secured to its ends the connecting rods 58 and 59, which, in turn, are secured, in any desired manner, to the guides 46 and 47. Surrounding each rod 58 and 59, between the guides 46 and 47 and plates 60 and 61 (Figs. 1 and 3) secured to the table 10, are two compression springs 62 and 63, respectively, which normally maintain the pusher plates in their upper positions. The design of the cam 52 is such as to positively move the pusher plates 42 etc. downwardly, but permits the plates to be yieldably urged upwardly under action of the springs 62 and 63.

Figure 6:
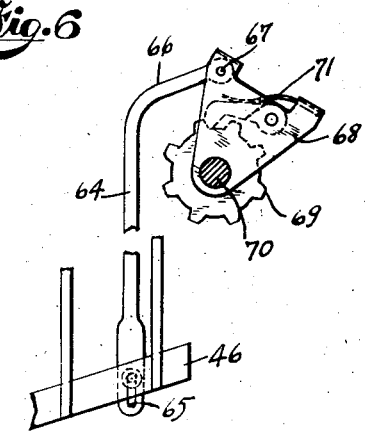
Fig. 6 is a detail of the operating mechanism for a feed roller.
Figure 7:
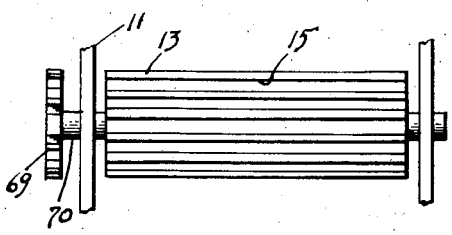
Fig. 7 is a plan view of the feed roller.

Guides 46 and 47 preferably carry a suitable mechanism for operating the feed roller 13, said mechanism being actuated in synchronism with the pusher plates. A preferred means for this purpose, illustrated more clearly in Fig. 6, comprises an arm 64, secured, at one end, by a lost-motion connection 65, to the guide 46. The other end of the arm has an angular extension 66 pivotally connected at 67 to a U-shaped housing 68, astride a ratchet wheel 69 which, in turn, is pivotally mounted on the shaft 70, which carries the ratchet wheel 69 and the roller 13 fixed thereto. The housing 68 has, pivotally secured within its wall, a spring-pressed pawl 71 adapted to engage and impart intermittent rotation to the ratchet wheel and feed wheel 13 when the guide 46 is lowered.

For convenience uniformity of action and positiveness, the feeding operation of the canes in succession preferably includes a reciprocating pusher plate 72 operating in the slot 73 formed between the upper edge of the plate 23 and the lower edge of the plate 18. The upper face 74 of this pusher plate is preferably beveled, so that cane raised by the plate may readily roll off under the influence of its potential energy. The upper face 74 of this pusher plate may be guided in a manner similar to the other pushers.

Canes passing through the gages are deflected by baffles 75, one of which is secured to the under side of each of the plates 23 etc. adjacent apertures 28 etc., to the chutes 76, 77, 78 and 79, which guide them to suitable containers, not shown.

Motion may be imparted to the shaft 55 by any suitable means, as by an electric motor 80, universal joint 81 and a reduction gear 82. Control for the motor 80 may be had by a conveniently placed switch 83, connected by wires 84 to the motor.

The general operation of the machine may be described as follows: With the motor running and the parts positioned as illustrated in Fig. 3, it will be observed that a cane is about to be raised by the pusher 72 which is urged upwardly by the operation of the springs 62 and 63. At this time as the cam 52 is moving away from the foot-piece 53, the springs 62 and 63 are free to act. Upon continued movement upwardly, the pusher 42 etc. and 72 engage any cane resting in the gage points and pocket 20 and raise them to a point above the ledges 36, when under action of the potential energy stored within them due to their position, and the beveled face of the pusher plates, they will roll off the pusher onto the inclined surfaces of the plates 23 etc. and roll down toward the next pusher plate or gage.

As all the pushers reach their uppermost positions, the feeding mechanism operates by having the pawl 71 drop behind a tooth on the ratchet wheel 69. Such operation takes place during the latter part of the upward movement of the pushers because of the lost-motion connection 65. The pushers then move downwardly under the influence of the cam and, just prior to their disappearing below the upper face of the plates 23 etc. they are engaged by the downwardly moving stream of canes, and the progress of the canes is thus momentarily checked. Continued movement of the pushers downwardly releases the canes and they are then free to again move, at a retarded speed, into the next gaging aperture.

Canes which pass through the gages drop first to the faces of the pushers and then to the chutes 76 etc. which guide the canes to suitable containers. Those canes which have only one end pass through the gaging aperture are lowered at that end but not permitted to pass through the aperture, so that, upon a subsequent movement of the pushers upward, they will be moved out of that aperture. As the pushers near the lowermost position of their downward stroke, the arm 64 is actuated to rotate the ratchet wheel 69 and the feed roller 13 to bring another cane into position to be engaged by the pusher 72 on its next stroke upwardly. Canes which do not pass through any of the gages are led from the machine by a chute 85.

If, however, a cane becomes jammed, it is apparent that no excessive damage will result, as the force acting upon the pushers is that of the springs only, the cam being permitted to continue rotating without any resultant damage or breakage taking place on account of any positive movement upwardly of the pushers. It is to be noted that jamming of the machine can only take place between the lowest position reached by the pushers and the point where they emerge from the gaging apertures. Since the lost-motion connection 65 corresponds in length to this distance, it is apparent that movement of the guides 46 and 47 vertically within this limit will have no effect upon the arm 64 and, consequently, upon the feed mechanism.

The structural details of the machine may be variously modified without departing from the spirit and scope of the invention, and it is, therefore, to be understood that the invention is not restricted to the precise embodiment herein shown and described, but that it comprehends all such modifications as fall within the scope of the appended claims.

What is claimed is:

1. A cane gaging machine comprising an inclined guide having an elongated aperture, a plurality of gage-jaws for gaging cane passing through said aperture, an ejector plate movable through said aperture and grooves in said plate to permit a movement of the plate adjacent to said gaging jaws.

2. A cane gaging machine comprising an inclined guide having a plurality of elongated slots, a plurality of gage-jaws associated with each slot, ejector plates movable through said slots and grooves in said plates to permit the plates to fill said slots and pass said jaws.

3. A cane gaging machine comprising an inclined guide having a plurality of elongated slots, a plurality of adjustable gage-jaws associated with each slot, ejector plates reciprocable in said aperture and slots in said plates to permit the plates to fill said apertures and pass said jaws.

4. In a cane gaging machine the combination of a hopper, an inclined guide, elongated slots in said guide, gaging jaws associated with said slot to provide gaging apertures, means for adjusting said jaws to vary the width of the gaging apertures, ejector plates having grooves therein to permit passage between said gaging jaws, means associated with said hopper for individually ejecting cane therefrom for passage over said guide for movement by gravity to said gaging jaws.

5. In a cane gaging machine the combination of a hopper, an inclined guide, elongated slots in said guide, a plurality of gaging jaws associated with said slots, ejector plates movable in said slots and having grooves to permit passage between said jaws, means for discharging cane individually from said hopper for movement by gravity to said gaging jaws and means for intermittently actuating said ejector plates to remove cane not passing between pairs of gaging jaws.

6. In a cane gaging machine the combination of means for feeding cane individually, an inclined guide having a plurality of elongated slots, a plurality of pairs of gaging apertures, one jaw of each pair being adjustable to vary the width of said gaging aperture, ejector plates movable intermittently through said gaging apertures and having grooves to permit said ejector plates to substantially fill said slot and pass said jaws.

7. In a cane gaging machine the combination of an inclined guide having a plurality of elongated slots, a plurality of pairs of gaging jaws associated with each slot to provide gaging apertures, one jaw of each pair of jaws being movable to vary a gaging opening of a slot, ejector plates movable to eject over-sized cane from said gaging apertures, said plates having grooves to permit their passage between said jaws.

8. In a cane gaging machine the combination of an inclined guide having a plurality of elongated slots to provide gaging apertures, a plurality of pairs of gaging jaws associated with each slot to provide gaging apertures, one jaw of each pair of jaws being movable to vary a gaging aperture, ejector plates movable through said slots and proportioned to substantially fill the same, grooves in said plates to permit the passage of portions of the plates through said gaging apertures, a hopper, means in said hopper for individually discharging cane and common means for actuating said plates and said discharge means in said hopper.

9. An article-gaging device comprising a series of gages, an article remover adapted to cause articles not gaged by one gage to move to another gage, a continuous driving means for said article remover and means independent of said driving means for rendering said article remover inoperative in case its movement is impeded.

10. A gaging device having a gage and means comprising a member movable vertically in said gage for removing an article not gaged from said gage, said member being yieldably mounted to prevent breakage.

11. A gaging device comprising a gage, an ejector member for removing an article not gaged, actuating means for said member and means for rendering said ejector member inoperative independent of said actuating means upon jamming of an article in said gage.

12. A gaging machine comprising a series of gages having gaging apertures, means moving in said apertures to remove articles not gaged thereby and means for moving said removing means positively in one direction and yieldably in the opposite direction.

13. In a gaging machine, the combination of feeding means, gages having gaging apertures, members movable in said apertures and means for rendering said feeding means inoperative when said gaging means is rendered inoperative when the movement of said members is impeded.

14. A gaging machine comprising a hopper, a conveyor for feeding articles in succession from said hopper, a plurality of gages arranged in descending formation and extending forwardly from said conveyor, a plurality of pusher plates, one for each gage, means for intermittently moving said conveyor, a common support for said means and said pusher plates, and means for positively moving said support in one direction and yieldably in the opposite direction, whereby the operation of said feeding means and said pusher plates may be arrested in case movement of said pusher plates is impeded.

15. A gaging device comprising a hopper, a feed wheel in said hopper, an inclined series of gaging apertures adjacent the lower edge of said hopper, means operating in said apertures for removing articles therefrom, means for arresting the progress of articles received from any aperture adjacent to such aperture, means for operating said feed wheel, means for operating said removing means, a common support for said two last mentioned means, means for positively moving said support in one direction and means for yieldably moving it in the opposite direction.

16. A gaging machine comprising a hopper, a feed roller for removing articles in succession from said hopper, a receiving pocket, a pusher plate in said pocket, a series of downwardly inclined plates spaced apart to form gaging apertures, pusher plates operating in said apertures, means for reciprocating said pusher plates positively in one direction and yieldably in the opposite direction, means for intermittently operating said feed roller, said last named means being carried by the means for reciprocating said pushers, chutes co-operating with said gaging apertures to receive articles passing through the apertures and means adjacent each gaging aperture to arrest the downward progress of the articles adjacent the apertures, whereby articles are moved in succession from said hopper to the gaging apertures and over the gaging apertures until gaged, the gaged articles passing through the apertures and out of the machine.

17. In a cane gaging machine, the combination of a hopper, a rotary conveyor adapted to feed cane individually from said hopper, an inclined guide having a plurality of elongated slots, a plurality of gaging jaws associated with each of said slots to provide gaging apertures, and means comprising members movable in said apertures for removing an article not gaged from the gaging jaws, said members being yieldably mounted to prevent breakage upon the jamming of cane.

18. A machine for assorting cane for the respective diameters, comprising a container for a plurality of cane, a feeding device for delivering cane individually from said container, means for gaging the cane, ejector means for moving cane not passing through the gaging means and means for moving said ejector members positively in one direction and yieldably in an opposite direction.

In testimony whereof, we have hereunto subscribed our names this third day of May, 1921.

JAMES BRYANT WHITMORE.
JOHN EBLING FERGUSON.